United States Patent
Demaret et al.

(10) Patent No.: US 7,278,791 B2
(45) Date of Patent: Oct. 9, 2007

(54) CONTACT ELEMENT FOR A MULTICONTACT CONNECTOR, AND SUCH A CONNECTOR

(75) Inventors: Emmanuel Demaret, Tours (FR); Luc Kaes, Tempe, AZ (US); Marnix van der Mee, Montlouis-sur-Loire (FR)

(73) Assignee: Radiall, Rosny-Sous-Bois (FR)

( * ) Notice: Subject to any disclaimer, the term of this patent is extended or adjusted under 35 U.S.C. 154(b) by 69 days.

(21) Appl. No.: 11/356,017

(22) Filed: Feb. 17, 2006

(65) Prior Publication Data

US 2006/0199407 A1 Sep. 7, 2006

(30) Foreign Application Priority Data

Feb. 24, 2005 (FR) .................................. 05 50510

(51) Int. Cl.
*G02B 6/36* (2006.01)
*G02B 6/38* (2006.01)

(52) U.S. Cl. ..................... 385/88; 385/89; 385/92; 385/53

(58) Field of Classification Search ............ 385/88
See application file for complete search history.

(56) References Cited

U.S. PATENT DOCUMENTS

| | | | |
|---|---|---|---|
| 3,792,284 A | | 2/1974 | Kaelin |
| 4,427,879 A | * | 1/1984 | Becher et al. ............... 250/215 |
| 5,337,388 A | | 8/1994 | Jacobowitz et al. |
| 5,577,146 A | | 11/1996 | Musk |
| 5,757,998 A | | 5/1998 | Thatcher et al. |
| 5,930,428 A | * | 7/1999 | Irwin et al. ............... 385/88 |
| 6,450,822 B1 | | 9/2002 | Eller |
| 2003/0063397 A1 | | 4/2003 | Inujima et al. |
| 2003/0194914 A1 | | 10/2003 | Duck et al. |
| 2005/0018972 A1 | * | 1/2005 | Anderson et al. ............... 385/53 |

FOREIGN PATENT DOCUMENTS

| | | |
|---|---|---|
| EP | 0 709 699 A2 | 5/1996 |
| EP | 0 847 107 A1 | 6/1998 |
| EP | 1 102 097 A2 | 5/2001 |
| JP | 10-189125 | 7/1998 |

* cited by examiner

*Primary Examiner*—Frank G. Font
*Assistant Examiner*—Mary El-Shammaa
(74) *Attorney, Agent, or Firm*—Oliff & Berridge, PLC

(57) ABSTRACT

A contact element for a multicontact connector may be configured to be connected to a complementary other multicontact connector element. The contact element may include:
- a body including two longitudinal ends, the body being configured to be capable of being mounted, preferably in a removable manner, in a slot of an insulating insert of a multicontact connector;
- at least one optical termination at one of the ends of the body;
- at least one electrical termination at the other one of the ends of the body; and
- an optoelectronic converter housed at least in part in the body and configured to convert an optical signal, or an electrical signal, respectively coming from the optical termination or the electrical termination, into an electrical signal or an optical signal, respectively, for sending to the electrical termination or the optical termination, respectively.

21 Claims, 4 Drawing Sheets

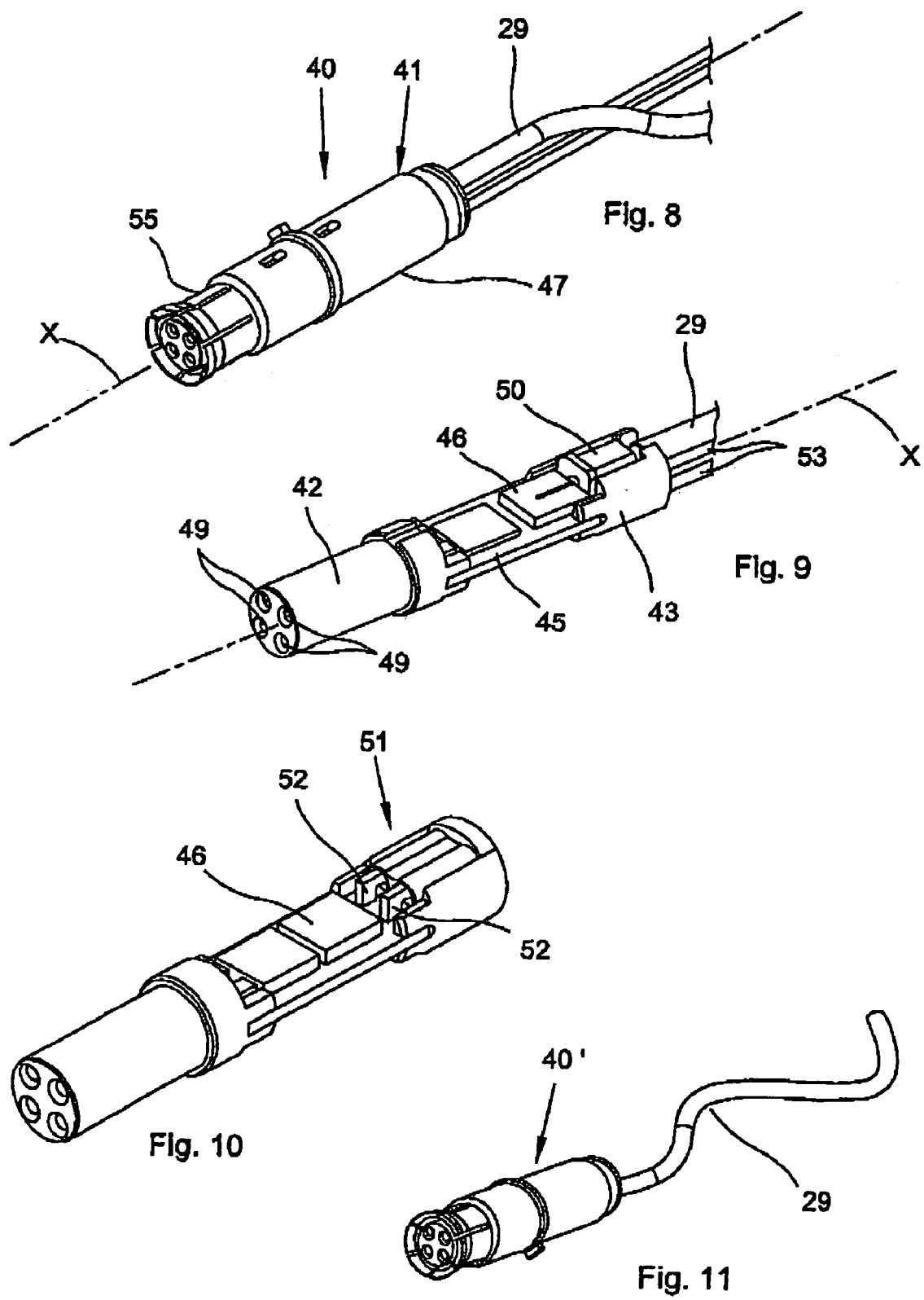

CONTACT ELEMENT FOR A MULTICONTACT CONNECTOR, AND SUCH A CONNECTOR

The present invention relates to a contact element for a multicontact connector, and to such a connector.

The invention relates more particularly to the field of equipment for use on board aircraft.

BACKGROUND

U.S. Pat. No. 5,930,428 discloses an on-board system comprising equipment that receives a removable module known as a line replaceable unit (LRU); the LRU module having a connector with an active optoelectronic device connected thereto.

That known system serves in particular to avoid having connection fibers present between the connector and the associated optoelectronic device disposed on a printed circuit card behind the connector, thereby reducing the overall bulk of the system.

In general, known systems can present the following drawbacks:
  the connectors are adapted to specific applications, each type of connector having a predetermined number of optoelectronic converters disposed at specific locations;
  a connector presenting a relatively large number of optoelectronic converters receives a correspondingly smaller number of contact elements because of the size and the shape of the optoelectronic converters; and
  mounting an optoelectronic converter in the connector is relatively complex and must in general be performed on the premises of the connector manufacturer.

SUMMARY

The invention seeks in particular to mitigate the above drawbacks.

The invention thus provides a contact element for a multicontact connector, the contact element being suitable for being connected to another contact element of a complementary multicontact connector, the contact element comprising:
  a body having two longitudinal ends, the body being arranged to be capable of being mounted in preferably removable manner in a slot of an insulating insert of a multicontact connector;
  at least one optical termination at one of the ends of the body;
  at least one electrical termination at the other end; and
  an optoelectronic converter housed at least in part in the body and arranged to convert an optical signal, or respectively an electrical signal, coming from the optical termination or respectively the electrical termination into an electrical signal or respectively an optical signal for sending to the electrical termination or respectively the optical termination.

Where appropriate, the converter can be arranged to be capable of converting an optical signal into an electrical signal, and vice versa.

By means of the invention, the contact element including the optoelectronic converter can be mounted in relatively simple manner in the slot in the insulating insert of the multicontact connector.

In particular, the contact element of the invention can be mounted and dismounted using standard tools.

In an embodiment of the invention, the body presents a longitudinal dimension measured between the two longitudinal ends that is greater than the greatest transverse dimension of the body.

The electrical termination may comprise, for example, at least one electrically conductive pin. The pin may be suitable for being connected to a conductor track on a printed circuit card, in particular by soldering, etc., or to an electrical contact element of a complementary connector.

The contact element of the invention may be of the male type, or respectively of the female type, being designed to couple with another contact element of the female or respectively male type.

The invention also provides a multicontact connector comprising:
  a support including at least two slots each arranged to receive a contact element; and
  at least a first contact element as defined above, mounted in a slot of the support, preferably in removable manner.

Advantageously, the connector further comprises a second contact element with electrical terminations only, or optical terminations only, having no optoelectronic converter, the connector being arranged in such a manner that the first and second contact elements can be mounted equally well in either of the slots of the support.

The first and second contact elements preferably present substantially the same outside shape.

By means of the invention, and depending on the type of application for which the connector is intended, it is possible to mount in the connector a varying number of first contact elements, each including an optoelectronic converter and/or contact elements without a converter.

For example, if so desired, it is possible to replace a first contact element having an optoelectronic converter with a contact element that is purely electrical or purely optical.

The connector of the invention thus presents modularity enabling it to be adapted to a predetermined type of application.

The second contact element(s) having electrical terminations only or respectively optical terminations only, may be of standard type.

In addition, the density of contact elements on the connector can be independent of the number of optoelectronic converters, since the first and second contact elements can present the same outside shape and can be used interchangeably to replace each other on the connector.

In an embodiment of the invention, the support includes a casing presenting a housing in which an insert is mounted, the slots being made in the insert, and preferably all being identical.

By means of the invention, the insert can be used in association with a varying number of contact elements that include respective optoelectronic converters, which inserts can be inserts of standard type not requiring any particular adaptation as a function of the number of converters.

In another embodiment of the invention, the support is made as a single piece, in particular a piece suitable for being mounted directly on a piece of equipment or a chassis.

In an embodiment of the invention, the first contact element is disposed on the support in such a manner that its end from which the electrical termination extends serves for making an electrical connection with an electrical contact element of a complementary connector.

In a variant, the first contact element is disposed on the support in such a manner that its end from which the optical termination extends serves for making an optical connection with an optical contact element of a complementary connector.

Where appropriate, the contact element including an optoelectronic converter is arranged to be capable of being mounted or dismounted either through a front face or through a rear face of the support.

The first contact element body may comprise:
front and rear insulated portions,
a printed circuit card placed between front and rear insulated portions, the optoelectronic converter being fixed on the printed circuit card,
an outer electrically conductive sleeve in which the insulated portions and the printed circuit card are at least partially inserted.

The first contact element may comprise at least one power supply line for the optoelectronic converter, distinct from electrical terminations or, in a variant, extending through one or a plurality of electrical terminations.

The first contact element may comprise four electrical terminations placed regularly about a longitudinal axis of the contact element.

The connector may be of the male type or of the female type.

The connector may be of the rectangular type, or it may be of the circular type.

The invention also provides equipment for mounting on a chassis, for example, preferably in removable manner, the equipment being constituted, for example, by a removable LRU module for mounting on board an aircraft, the equipment comprising:
a connector as defined above; and
optionally a printed circuit card having at least one contact element of the connector connected thereto, in particular by soldering a pin of the contact element or by means of an electrical cable crimped onto a pin of the contact element, the printed circuit card being distinct from the connector, for example.

The equipment may include a panel through which the connector extends.

The equipment may be arranged to be mounted on an element other than a chassis, said element being constituted, for example, by a connector connected to one or more electrical or optical cables.

The equipment may also be arranged to be capable of being mounted on a connector secured to a metal sheet or to a panel of the aircraft.

The invention may also provide a chassis for receiving a piece of equipment, preferably removably, the chassis being in particular on board an aircraft, the chassis including at least one connector as defined above.

The invention also provides a system for mounting in particular on board an aircraft, the system comprising:
a chassis including a first multicontact connector;
a piece of equipment mounted on the chassis and including a second multicontact connector suitable for coupling with the first connector;

at least one of the connectors including at least one contact element having an optoelectronic converter as defined above.

The system may be arranged in such a manner that the connections between the first and second connectors are all electrical, or respectively are all optical.

The invention also provides a method of assembling a multicontact connector as defined above, the method comprising the following steps:

mounting the first contact element in one of the slots of the support; and
optionally removing the first contact element from the slot, and replacing it with a second contact element comprising electrical terminations only or respectively optical terminations only.

Advantageously, the operation of mounting or dismounting the first contact element in a multicontact connector is identical to the operation of mounting or dismounting a second contact element in said connector, the element comprising electrical terminations only or respectively optical terminations only.

The invention also provides an assembly comprising:
a printed circuit card having at least one conductor track;
at least one contact element suitable for being connected to a complementary contact element, the contact element comprising:
a body having two longitudinal ends;
at least one optical termination at one of the ends of the body;
at least one electrical termination at the other end of the body, the electrical termination comprising an electrical pin connected in particular by soldering to a conductor track of the printed circuit card; and
an optoelectronic converter housed at least in part in the body and arranged to convert an optical signal or respectively an electrical signal coming from the optical termination, or respectively the electrical termination, into an electrical signal, or respectively an optical signal, sent to the electrical termination, or respectively the optical termination;

the contact element being held on the printed circuit card essentially by the electrical pin being secured to the card.

The contact element may be held in particular on the printed circuit card without involving a connector.

The contact element of the above-defined assembly can be specifically of the type that is releasably mountable in a slot of a support, depending on the desired application.

The invention also provides a method of fabricating an assembly as defined above, the method including the following steps:
securing the contact element to the printed circuit card by fastening one or more electrical pins of the contact element to the card, preferably without using a connector casing.

The invention also provides a contact element for a multicontact connector, for instance a connector as disclosed above, the contact element being configured for being connected to another contact element of a complementary multicontact connector, the contact element comprising:
a body having two longitudinal ends, the body being arranged to be capable of being mounted in preferably removable manner in a slot of an insulating insert of a multicontact connector;
at least one optical termination at one of the ends of the body;
at least one electrical termination at the other end; and
an optoelectronic converter housed at least in part in the body and arranged to convert an optical signal, or respectively an electrical signal, coming from the optical termination or respectively electrical termination into an electrical signal or respectively an optical signal for sending to the electrical termination or respectively the optical termination, the body comprising:
front and rear insulated portions, a printed circuit card situated between said rear and front insulated portions, the optoelectronic converter being fixed on the printed circuit card, an outer electrically conductive sleeve in which the insulated portions and the printed circuit card are at least partially engaged.

BRIEF DESCRIPTION OF THE DRAWINGS

The invention can be better understood on reading the following description of non-liming embodiments of the invention, and on examining the accompanying drawings, in which:

FIG. 8 is a diagrammatic and fragmentary view, in perspective, of a contact element in accordance with the invention;

FIG. 9 is a diagrammatic and fragmentary view of the contact element of FIG. 8, without the outer sleeve;

FIG. 10 is a diagrammatic and fragmentary view of the elements of FIG. 9, from an opposite side; and FIG. 11 is a diagrammatic and fragmentary view of a contact element in accordance with another embodiment of the invention.

MORE DETAILED DESCRIPTION

Figure 1:
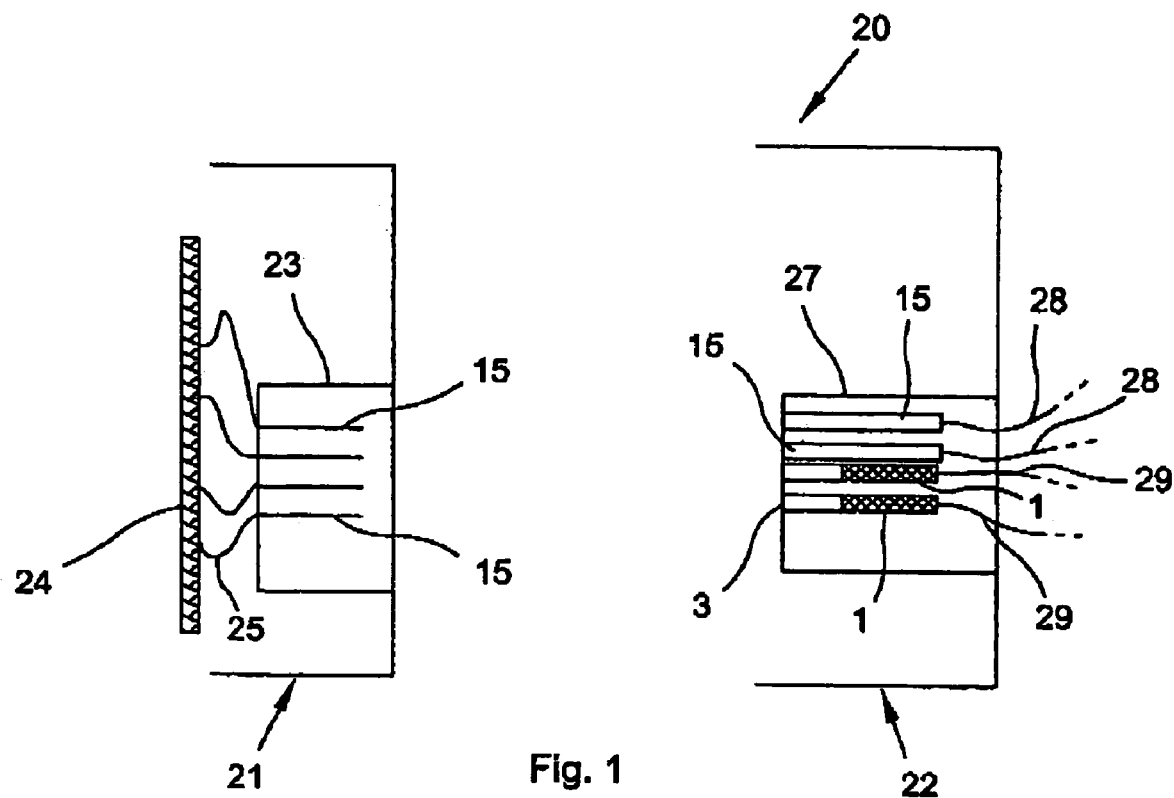
FIG. 1 is a diagrammatic and fragmentary view of a system in accordance with the invention.

FIG. 1 shows a system 20 in accordance with the invention, comprising a piece of equipment 21 for mounting in a chassis 22.

The equipment 21 comprises a connector 23 having standard electrical contact elements 15 mounted thereon.

The electrical contact elements 15 are connected to a printed circuit card 24 of the equipment 21 by electrical cables 25 that are crimped on the contact elements 15.

In a variant, each electrical contact element 15 may have one or more electrically conductive pins soldered directly to one or more conductor tracks of the printed circuit card 24.

The chassis 22 includes a multicontact connector 27 in accordance with the invention suitable for coupling with the connector 23 of the equipment 21.

The connector 27 receives a plurality of electrical contact elements 15 suitable for being connected with electrical contact elements 15 of the connector 23.

The connector 27 also receives a plurality of contact elements 1, each including an optoelectronic converter 8.

Figure 3:
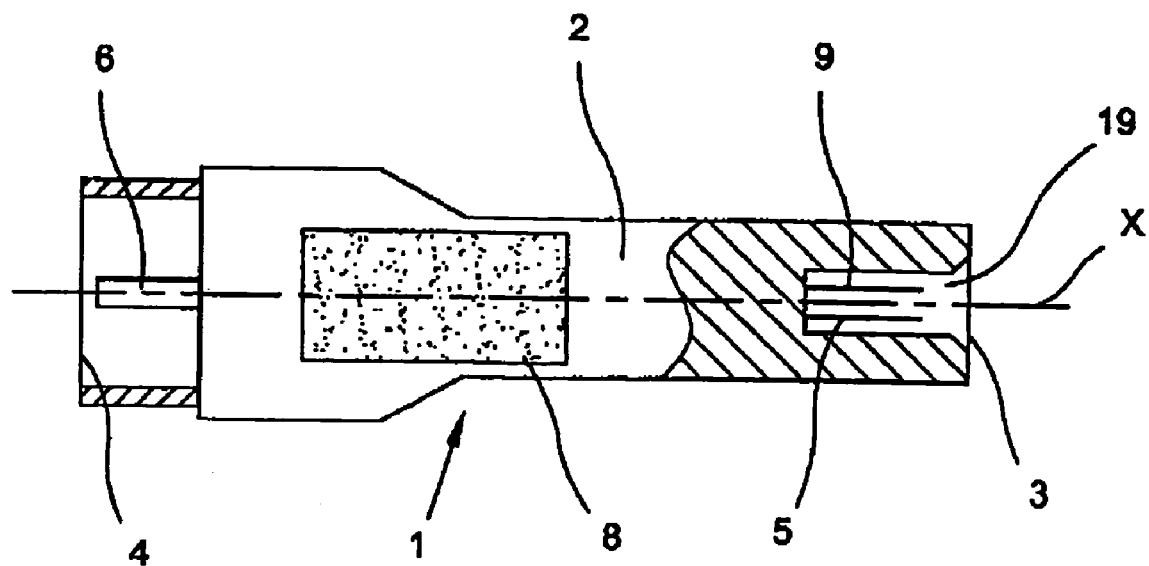
FIG. 3 is a diagrammatic and fragmentary view of a contact element in accordance with the invention, including an optoelectronic converter.

FIG. 3 shows such a contact element 1 in accordance with the invention comprising a body 2 that is substantially tubular about an axis X and that has longitudinal ends 3 and 4.

In the example described, the body 2 presents a longitudinal dimension measured between the two longitudinal ends 3 and 4 that is greater than the longest transverse dimension of the body 2.

The end 3 is provided with at least one electrical termination 5 formed by an electrically conductive pin housed for example in a setback 19 of the body 2, and the end 4 is provided with an optical termination 6.

The body 2 houses an optoelectronic converter 8 arranged to convert an optical signal, or respectively an electrical signal, coming from the optical termination 6, or respectively the electrical termination 5, into an electrical signal, or respectively an optical signal, sent towards the electrical termination 5, or respectively the optical termination 6.

The end 3 may be provided with pins 9 for electrically powering the optoelectronic converter 8.

In a variant (not shown), the end 3 has five electrical pins.

The contact element 1 is for connecting to another contact element of a complementary multicontact connector.

Figure 4:
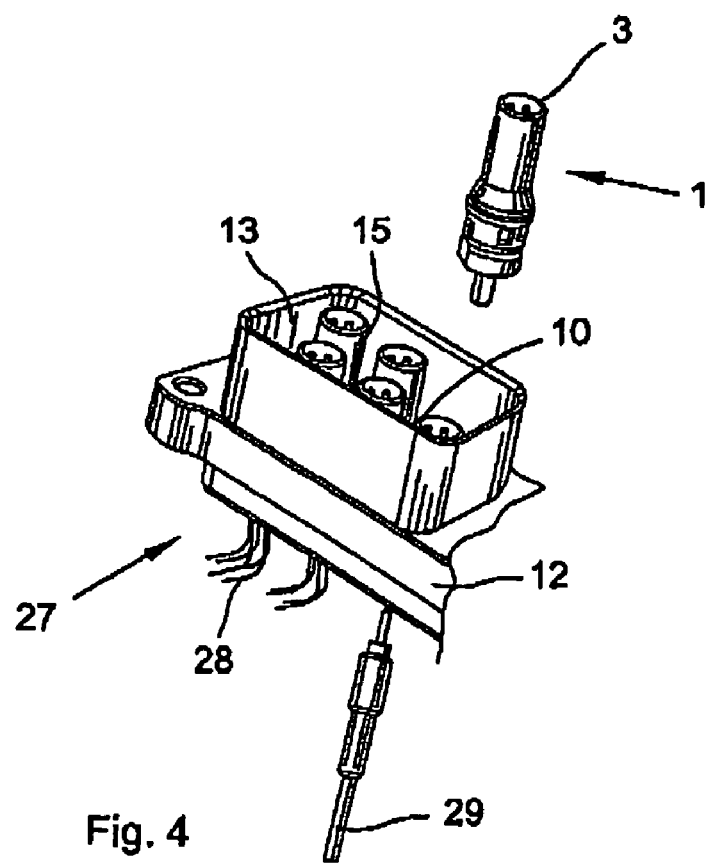
FIG. 4 is a diagrammatic and fragmentary view showing a multicontact connector in accordance with the invention.

The body 2 is arranged to be capable of being mounted removably in a slot of an insulating insert 10 of the multicontact connector 27, as shown in FIG. 4.

The multicontact connector 27 comprises a casing 12 presenting a housing 13 in which the insert 10 having a plurality of slots is mounted.

The slots of the insert 10 may all be identical and the contact element 1 may present an outside shape that is identical to the outside shape of the standard electrical contact elements 15 that have electrical terminations only.

Thus, depending on the type of application for which the connector 27 is intended, it is possible to provide the connector 27 with a predetermined number of contact elements 1, each including an optoelectronic converter 8 and a predefined number of standard contact elements 15 that are purely electrical and/or purely optical.

As can be understood, the invention makes it possible to modulate the connector 27 as a function of the application for which it is intended, and in particular to do so without having to modify the insert 10.

The contact element 1 is mounted and dismounted in the same manner as a standard contact element 15.

In a variant, the insert 10 may include at least two slots of different types, e.g. slots of a first type associated with purely electrical contact elements, and slots of a second type associated with purely optical contact elements.

The electrical contact elements 15 of the connector 27 are connected to electrical cables 28 and the contact elements 1 are connected to optical fibers 29, as shown in FIG. 1.

Each contact element 1 including an optoelectronic converter 8 is designed to couple with the electrical contact elements 15 of the connector 23.

To this end, each contact element 1 includes at its end 3 at least one electrical termination for coupling with an electrical contact element 15 of the connector 23.

The electrical contact elements 15 are either of the male type or of the female type for acting, as the case may be, to co-operate with an electrical contact element 15 of the female type or of the male type.

As can be understood, the system 20 enables connections to be made between the connectors 23 and 27 that are solely of the electrical type, which can facilitate various mounting operations, making it possible in particular to avoid any need to clean the various interfaces during mounting or dismounting of the equipment 21.

Figure 2:
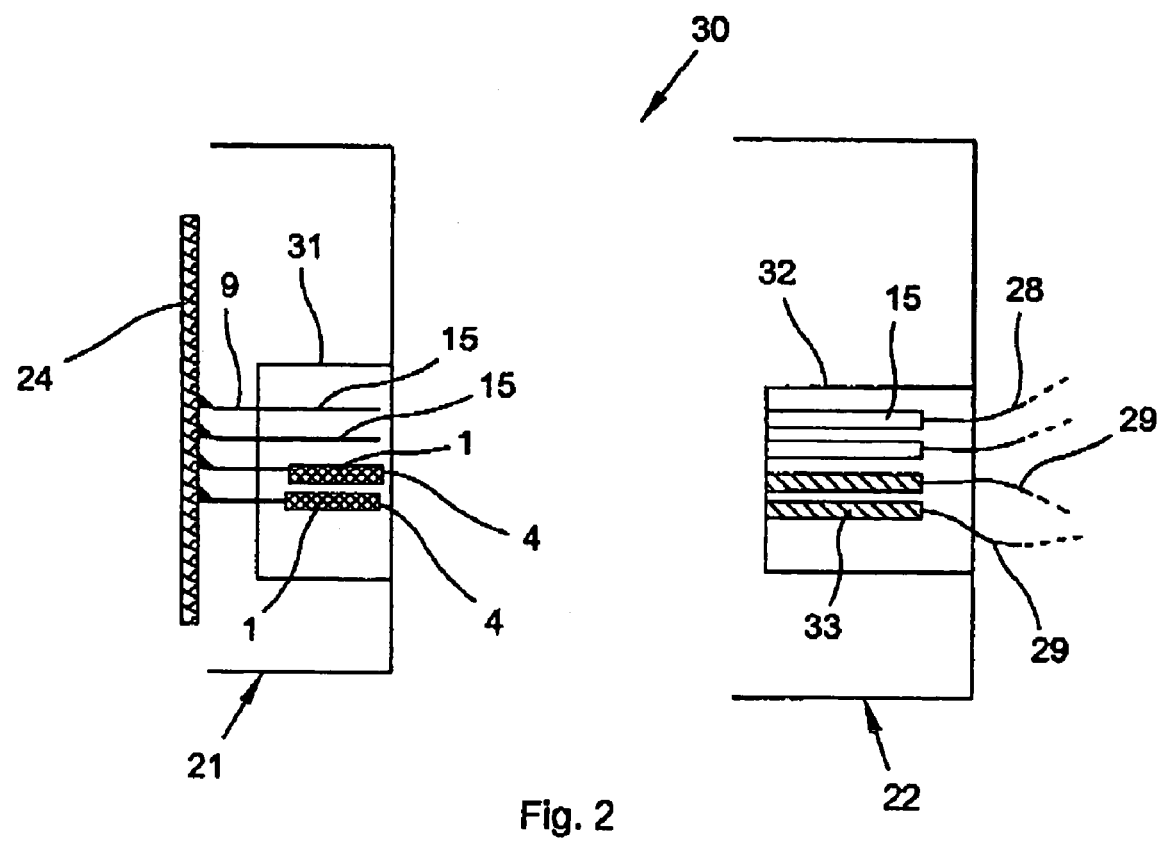
FIG. 2 is a diagrammatic and fragmentary view of a system in accordance with a variant embodiment of the invention.

FIG. 2 shows a system 30 in accordance with a variant embodiment of the invention.

The equipment 21 comprises a connector 31 having electrical contact elements 15 mounted thereon presenting one or more pins 9 that are soldered to the printed circuit card 24.

Figure 6:
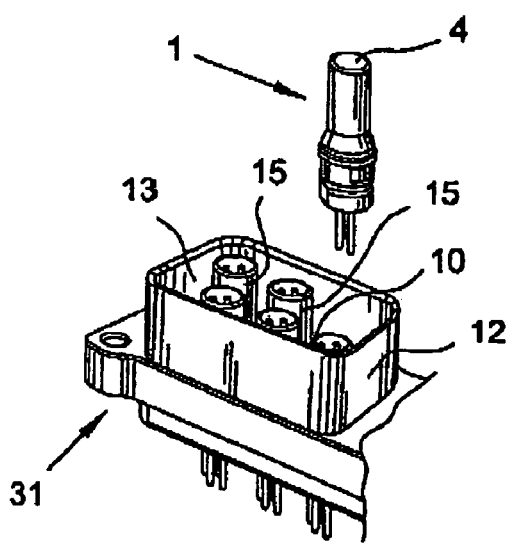
FIG. 6 is a diagrammatic and fragmentary view of a multicontact connector in accordance with a variant of the invention.

The multicontact connector 31 also receives a plurality of contact elements 1 each including an optoelectronic converter 8, as shown in FIG. 6.

The chassis 22 includes a multicontact connector 32 having mounted thereon a plurality of electrical contact elements 15 and a plurality of optical contact elements 33 having optical terminations only.

Figure 5:
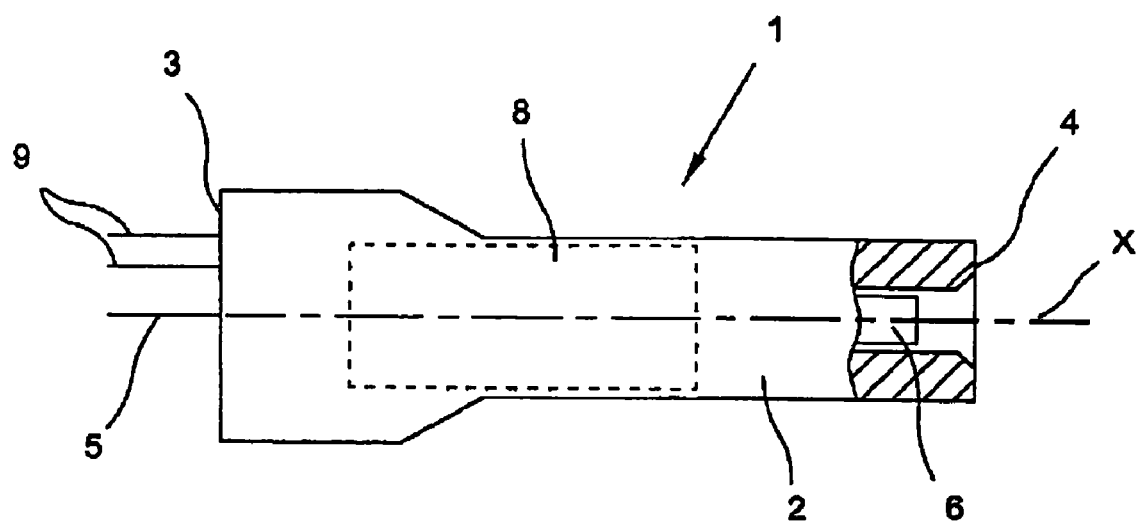
FIG. 5 is a diagrammatic and fragmentary view of a contact element in accordance with another embodiment of the invention.

The contact elements 1 are arranged in such a manner that the end 4 comes to couple with an optical contact element 33 of the connector element 32, as shown in FIGS. 5 and 6.

Naturally, the invention is not limited to the embodiments described above.

The body 2 of the contact element 1 may be of a different shape, for example its cross-section could be non-circular.

The connector 27 may be of rectangular type, as shown in FIG. 4, or in a variant it may be of circular type.

Figure 7:
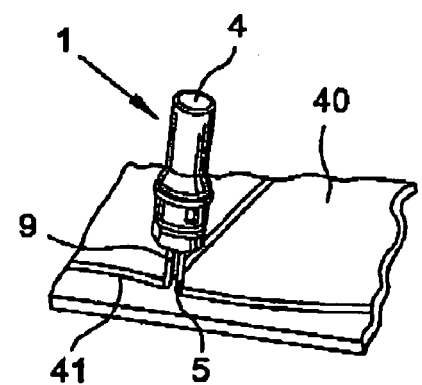
FIG. 7 is a diagrammatic and fragmentary view of an assembly including a contact element in accordance with the invention.

By way of example, the contact element 11 may be secured to a printed circuit card 40, with the pins 5 and/or 9 being soldered to the card 40 in contact with conductor tracks 41 of the card 40, as shown in FIG. 7. The contact element 11 is not held via a connector.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

A contact element 40 is now described in accordance with FIGS. 8 to 10.

The contact element 40 comprises a body 41 comprising:
front and back insulated portions 42 and 43,
a printed circuit card 45 situated between the insulated portions 42 and 43 and fixed thereto, said card 45 carrying an optoelectronic converter 46,
an outer electrically conductive sleeve 47 in which the insulated portions 42 and 43 and the printed circuit card 45 are engaged.

The front insulated portion 42 comprises four channels 49 extending in a parallel manner to longitudinal axis X of contact element 40, said channels being regularly placed about said axis X.

Said channels 49 are configured for receiving each a pin.

Said pins are connected to the optoelectronic converter 46 and define electrical terminations according to the invention.

In the illustrated embodiment, the electrical terminations are configured to function two by two, two terminations being configured for receiving signals and two other terminations for emitting signals.

The rear insulated portion 43 carries an optical termination 50 connected to an optical fiber 29.

The power supply of the optoelectronic converter 46 is performed by a power supply line 51 comprising one or a plurality of contact pins 52 connected to, on a first hand, to the optoelectronic converter 46, and, on the other hand, to one or a plurality of power supply cables 53, as shown on FIGS. 9 and 10.

The electrically conductive sleeve 47 comprises, at the front, an assembling portion 55 having longitudinal slots enabling deformation of the portion when the contact element 40 is coupled with a complementary contact element.

The sleeve 47 has a shape that is substantially cylindrical about axis X.

In the embodiment disclosed above, the power supply of the optoelectronic converter 46 necessitates further electrical cables 53.

In a variant, as illustrated on FIG. 11, the contact element 40' is deprived of power supply cables for the optoelectronic converter.

The power supply is performed via one or a plurality of electrical terminations which serve both for receiving and/or emitting signals, and power supply of the optoelectronic converter.

The contact element 40 or 40' enables electrical contacts of "copper" type, as for known contact elements.

The use of an optical contact enables in particular to reduce the weight of the contact element.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A multicontact connector comprising:
   a support including at least two slots each configured to receive a contact element; and
   at least a first contact element, the contact element being configured to be connected to another contact element of another, complementary multicontact connector, the contact element comprising:
      a body including two longitudinal ends, the body being configured to be capable of being mounted in a slot of an insulating insert of a multicontact connector;
      at least one optical termination at one of the ends of the body;
      at least one electrical termination at the other one of the ends of the body; and
      an optoelectronic converter housed at least in part in the body and configured to convert at least one of an optical signal coming from the optical termination and an electrical signal coming from the electrical termination into a respective electrical signal or optical signal for sending to the electrical termination or the optical termination, respectively,
   the contact element being mounted in a cell of the support;
   a second contact element with only one of electrical terminations and optical terminations;
   the connector being configured so that the first and second contact elements are interchangeably mountable in the slots of the support.

2. A connector according to claim 1, wherein the body includes a longitudinal dimension measured between the two longitudinal ends that is greater than a longest transverse dimension of the body.

3. A connector according to claim 1, wherein the electrical termination includes at least one electrically conductive pin.

4. A connector according to claim 1, wherein the first and second contact elements include substantially a same outside shape.

5. A connector according to claim 1, wherein the support comprises a casing including a housing in which an insert is mounted, the slots being made in the insert.

6. A connector according to claim 1, wherein the first contact element is disposed on the support in such a manner that an end thereof from which the electrical termination extends is arranged to make an electrical connection with an electrical contact element of a complementary connector.

7. A connector according to claim 1, wherein the first contact element is disposed on the support in such a manner that an end thereof from which the optical termination extends is arranged to make an optical connection with an optical contact element of a complementary connector.

8. A connector according to claim 1, wherein the body of the first contact element comprises:
   front and rear insulated portions,
   a printed circuit card situated between the front and rear insulated portions, the optoelectronic converter being fixed on the printed circuit card, and
   an outer electrically conductive sleeve in which the insulated portions and the printed circuit card are at least partially engaged.

9. A connector according to claim 1, wherein the first contact element comprises at least one power supply line for the optoelectronic converter distinct from electrical terminations.

10. A connector according to claim 1, wherein the first contact element comprises at least one power supply line for the optoelectronic converter, said line extending through at least one electrical termination.

11. A connector according to claim 1, wherein the first contact element comprises four electrical terminations situated regularly about a longitudinal axis of the contact element.

12. Equipment including a connector according to claim 1.

13. Equipment according to claim 12, further comprising a printed circuit card to which at least one contact element of the connector is connected.

14. A chassis including at least one connector according to claim 1.

15. A system for mounting, the system comprising:
   a chassis including a first multicontact connector; and
   a piece of equipment mounted in the chassis and including a second multicontact connector configured to couple with the first connector, at least one of the connectors including at least one contact element, the contact element being configured to be connected to another contact element of a complementary multicontact connector, the contact element comprising:
      a body including two longitudinal ends, the body being configured to be capable of being mounted in a slot in an insulating insert of a multicontact connector;
      at least one optical termination at one of the ends of the body;
      at least one electrical termination at the other one of the ends of the body; and
      an optoelectronic converter housed at least in part in the body and configured to convert at least one of an optical signal coming from the optical termination and an electrical signal coming from the electrical termination into a respective electrical signal or optical signal for sending to the electrical termination or the optical termination, respectively.

16. A system according to claim 15, wherein the connections between the first and second connectors are one of all electrical and all optical.

17. A method of assembling a multicontact connector, the method comprising:
   providing a multicontact connector according to claim 1; and at least one of:
   mounting the first contact element in one of the slots of the support; and
   mounting a second contact element comprising electrical terminations in one of the slots of the support.

18. A method according to claim 17, wherein an operation of mounting the first contact element in a multicontact connector is identical to an operation of mounting the second contact element including only one of electrical terminations and optical terminations, in said connector.

19. An assembly comprising:
   a printed circuit card of at least one conductor track;
   at least one contact element configured to be connected to a complementary contact element, the contact element comprising:
      a body including two longitudinal ends;
      at least one optical termination at one of the ends of the body;
      at least one electrical termination at the other one of the ends of the body, including an electrical pin connected to the conductor track of the printed circuit card; and
      an optoelectronic converter housed at least in part in the body and configured to convert at least one of an optical signal coming from the optical termination and an electrical signal coming from the electrical termination into a respective electrical signal or optical signal for sending to the electrical termination or the optical termination, respectively;
   the contact element being held on the printed circuit card essentially by the electrical pin being secured to the card, without involving a connector.

20. A method of fabricating an assembly as defined in claim 19, the method comprising:
   securing the contact element to the printed circuit card by fastening at least one electrical pin of the contact element to the card.

21. A contact element for a multicontact connector, the contact element being configured to be connected to another contact element of a complementary multicontact connector, the contact element comprising:
   a body including two longitudinal ends, the body being configured to be capable of being mounted in a slot of an insulating insert of a multicontact connector;
   at least one optical termination at one of the ends of the body;
   at least one electrical termination at the other one of the ends of the body; and
   an optoelectronic converter housed at least in part in the body and configured to convert at least one of an optical signal coming from the optical termination and an electrical signal coming from the electrical termination into a respective electrical signal or optical signal for sending to the electrical termination or the optical termination, respectively,
   the body comprising:
      front and rear insulated portions,
      a printed circuit card situated between said rear and front insulated portions, the optoelectronic converter being fixed on the printed circuit card, and
      an outer electrically conductive sleeve in which the insulated portions and the printed circuit card are at least partially engaged.

* * * * *